US008984165B2

(12) United States Patent
Hughes

(10) Patent No.: US 8,984,165 B2
(45) Date of Patent: Mar. 17, 2015

(54) DATA TRANSFORMATION

(75) Inventor: Shannon Ray Hughes, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 407 days.

(21) Appl. No.: 12/247,777

(22) Filed: Oct. 8, 2008

(65) Prior Publication Data

US 2010/0088363 A1 Apr. 8, 2010

(51) Int. Cl.
*G06F 17/30* (2006.01)
*G06F 15/16* (2006.01)
*G06F 17/22* (2006.01)
*H04N 21/858* (2011.01)

(52) U.S. Cl.
CPC ............ *G06F 17/3089* (2013.01); *G06F 15/16* (2013.01); *G06F 17/30882* (2013.01); *G06F 17/30014* (2013.01); *G06F 17/2235* (2013.01); *H04N 2201/3249* (2013.01); *H04N 21/858* (2013.01)
USPC .......................................... 709/246; 715/531

(58) Field of Classification Search
CPC ....... G06F 15/16; G06F 3/1246; G06F 17/22; G06F 17/2235; G06F 17/30014; G06F 17/30882; G06F 17/3089; H04N 2201/3249; H04N 21/858
USPC ................... 709/246, 202; 715/531
See application file for complete search history.

(56) References Cited

U.S. PATENT DOCUMENTS

| | | | | |
|---|---|---|---|---|
| 5,659,729 A * | 8/1997 | Nielsen | ................................. | 1/1 |
| 5,884,312 A * | 3/1999 | Dustan et al. | ......................... | 1/1 |
| 5,961,601 A * | 10/1999 | Iyengar | ........................ | 709/229 |
| 5,983,184 A * | 11/1999 | Noguchi | ........................ | 704/270 |
| 5,987,482 A * | 11/1999 | Bates et al. | ................... | 715/206 |
| 6,317,781 B1 * | 11/2001 | De Boor et al. | ............... | 709/217 |
| 6,344,851 B1 * | 2/2002 | Roberts et al. | ................ | 345/418 |
| 6,585,776 B1 * | 7/2003 | Bates et al. | ................... | 715/206 |
| 6,633,878 B1 * | 10/2003 | Underwood | ......................... | 1/1 |
| 6,718,516 B1 * | 4/2004 | Claussen et al. | .............. | 715/234 |
| 6,721,741 B1 * | 4/2004 | Eyal et al. | ............................. | 1/1 |
| 6,886,025 B1 * | 4/2005 | Britton | ......................... | 709/201 |
| 7,054,818 B2 * | 5/2006 | Sharma et al. | ................ | 704/270 |
| 7,165,243 B1 * | 1/2007 | Pelegri-Llopart et al. | ..... | 717/136 |
| 7,197,530 B2 * | 3/2007 | Mehra et al. | .................. | 709/202 |
| 7,305,671 B2 * | 12/2007 | Davidov et al. | .............. | 717/172 |
| 7,353,464 B1 * | 4/2008 | Kundu et al. | ................. | 715/853 |
| 7,437,614 B2 * | 10/2008 | Haswell et al. | ............ | 714/38.13 |
| 7,478,142 B1 * | 1/2009 | Veditz | ............................. | 709/218 |
| 7,499,971 B1 * | 3/2009 | Chandran | ..................... | 709/203 |
| 7,512,710 B2 * | 3/2009 | Allen et al. | ................... | 709/245 |
| 7,526,537 B2 * | 4/2009 | Breeden et al. | ............... | 709/220 |

(Continued)

OTHER PUBLICATIONS

Jackson, "Assessing the Structure of Communication on the World Wide Web", Jun. 2006.*

(Continued)

*Primary Examiner* — O. C. Vostal
(74) *Attorney, Agent, or Firm* — Lowenstein Sandler LLP

(57) ABSTRACT

Some embodiments of data transformation have been presented. In one embodiment, a markup language file is transformed into a web server type page file. The transforming may include wrapping text in the markup language file with directives of a web server type page, using regular expression pattern matching to identify internal links in the markup language file, and converting the internal links identified into web server type page links.

27 Claims, 4 Drawing Sheets

(56) References Cited

U.S. PATENT DOCUMENTS

| | | | |
|---|---|---|---|
| 7,631,352 B1* | 12/2009 | Nelson et al. | 726/15 |
| 7,661,062 B1* | 2/2010 | Connaughton | 715/234 |
| 7,702,814 B2* | 4/2010 | Lee et al. | 709/246 |
| 7,747,782 B2* | 6/2010 | Hunt et al. | 709/246 |
| 8,046,360 B2* | 10/2011 | Tiyyagura | 707/737 |
| 8,131,883 B1* | 3/2012 | Reisman | 710/4 |
| 2002/0035611 A1* | 3/2002 | Dooley | 709/218 |
| 2002/0052928 A1* | 5/2002 | Stern et al. | 709/218 |
| 2002/0099852 A1* | 7/2002 | Fischer | 709/246 |
| 2002/0111922 A1* | 8/2002 | Young et al. | 705/80 |
| 2002/0147805 A1* | 10/2002 | Leshem et al. | 709/223 |
| 2003/0023756 A1* | 1/2003 | Awamoto et al. | 709/246 |
| 2003/0033606 A1* | 2/2003 | Puente et al. | 725/110 |
| 2003/0051236 A1* | 3/2003 | Pace et al. | 717/177 |
| 2003/0061106 A1* | 3/2003 | Orhomuru | 705/26 |
| 2003/0101245 A1* | 5/2003 | Srinivasan et al. | 709/221 |
| 2003/0110167 A1* | 6/2003 | Kim | 707/4 |
| 2003/0170006 A1* | 9/2003 | Bogda et al. | 386/96 |
| 2003/0191826 A1* | 10/2003 | Bellinger et al. | 709/220 |
| 2004/0128136 A1* | 7/2004 | Irani | 704/270.1 |
| 2004/0205557 A1* | 10/2004 | Bahrs et al. | 715/513 |
| 2004/0210556 A1* | 10/2004 | Brooke et al. | 707/1 |
| 2004/0243818 A1* | 12/2004 | Hamlett et al. | 713/193 |
| 2005/0021862 A1* | 1/2005 | Schroeder et al. | 709/246 |
| 2005/0028095 A1* | 2/2005 | Kondo et al. | 715/526 |
| 2005/0138004 A1* | 6/2005 | Teplitsky et al. | 707/3 |
| 2005/0177595 A1* | 8/2005 | Krieg et al. | 707/104.1 |
| 2005/0188295 A1* | 8/2005 | Konkus et al. | 715/500 |
| 2005/0198393 A1* | 9/2005 | Stutz et al. | 709/246 |
| 2005/0278718 A1* | 12/2005 | Griffith et al. | 717/175 |
| 2006/0010157 A1* | 1/2006 | Dumitrascu et al. | 707/102 |
| 2006/0026496 A1* | 2/2006 | Joshi et al. | 715/500.1 |
| 2006/0123028 A1* | 6/2006 | Fong et al. | 707/101 |
| 2006/0123107 A1* | 6/2006 | Chen | 709/224 |
| 2006/0129971 A1* | 6/2006 | Rojer | 717/104 |
| 2006/0136353 A1* | 6/2006 | Crockett et al. | 707/1 |
| 2006/0212864 A1* | 9/2006 | Calahan | 717/167 |
| 2006/0218242 A1* | 9/2006 | Tock et al. | 709/217 |
| 2006/0248456 A1* | 11/2006 | Bender et al. | 715/531 |
| 2006/0253508 A1* | 11/2006 | Colton et al. | 707/206 |
| 2006/0259331 A1* | 11/2006 | Lurtz et al. | 705/3 |
| 2006/0271977 A1* | 11/2006 | Lerman et al. | 725/88 |
| 2006/0282501 A1* | 12/2006 | Bhogal et al. | 709/203 |
| 2007/0073806 A1* | 3/2007 | Srinivas et al. | 709/203 |
| 2007/0106934 A1* | 5/2007 | Muschett et al. | 715/513 |
| 2007/0180049 A1* | 8/2007 | Chtcherbatchenko et al. | 709/217 |
| 2007/0180361 A1* | 8/2007 | Dovin et al. | 715/513 |
| 2007/0220107 A1* | 9/2007 | Reisman | 709/217 |
| 2008/0033997 A1* | 2/2008 | Banker | 707/104.1 |
| 2008/0046840 A1* | 2/2008 | Melton et al. | 715/825 |
| 2008/0077851 A1* | 3/2008 | Hesmer et al. | 715/234 |
| 2008/0172608 A1* | 7/2008 | Patrawala et al. | 715/255 |
| 2008/0172620 A1* | 7/2008 | Yoshimura et al. | 715/760 |
| 2009/0006523 A1* | 1/2009 | Kordun et al. | 709/202 |
| 2009/0012869 A1* | 1/2009 | Henkin et al. | 705/14 |
| 2009/0106651 A1* | 4/2009 | Gorog | 715/273 |
| 2009/0132551 A1* | 5/2009 | Allen et al. | 707/10 |
| 2009/0157683 A1* | 6/2009 | Bantupalli et al. | 707/8 |
| 2009/0172637 A1* | 7/2009 | Parikh | 717/114 |
| 2009/0210864 A1* | 8/2009 | Oberhauser et al. | 717/140 |
| 2009/0298529 A1* | 12/2009 | Mahajan | 455/550.1 |

OTHER PUBLICATIONS

Eiron et al., "Untangling Compund Documents on the Web", 2003.*
Zisman et al., Using Web Services to Interoperate Data at the FAO, 2002.*
Rajagopal et al., "Performance Optimization Appraisal on Web-enabling Legacy Applications", 2001.*
Graba, "An Introduction to Network Programming with Java", 2006.*
Gomez et al., "Conceptual Modeling of Device-Independent Web Applications", 2001.*
Kuslich, "Introduction to JavaServer Pages", 1999.*
Moodle et al., "Pro Apache Tomcat 6", charper 7, 2007.*
McLaughlin, "Java & XML Data Building", 2002.*
Bayeh, "The WebSphere Application Server architecture and programming model", 1998.*
Ghanem et al., "Databases Deepen the Web", 2004.*
Mahmoud, "Development with JSP and XML—Part II: JSP with XML in mind", 2001.*
Wilson, "Extensible Programming for the $21^{st}$ Century" 2004.*
Moore et al., "Steps to Converting HTML page To JSP", 2004.*
Borenstein, "Multipurpose Internet Mail Extensions (MIME) Part One: Format of Internet", RFC 2045, 1996.*
Puder, "Extending Desktop Applications to the Web", 2004.*
Cordone et al., "Using XForms to Simplify Web Programming", 2005.*
Leigh, "Java XML Converter (JXC)", 2010.*
Falkner, "Javaserver Pages", Chapter 3, 2003.*
Yan et al., "Experiments with JSP, XML, CORBA and HDF5", 2002.*
Jabbour et al., "Wrapping Web Pages Into XML Documents: A Practical Experience and Comparison of Two Tools", Copyright 1997-2001.*
Downey, "Web Development with Java Using Hibernate, JSPs and Servlets", 2007.*
Chang et al., "A Survey of Web Information Extraction Systems", 2006.*
Carme et al., "The Lixto Project: Exploring New Frontiers of Web Data Extraction", 2006.*
Huff, "The Definitive Guide to Stellent Content Server, Chapter 12: Advanced Topics", 2006.*
Miller et al., "SPHINX: a framework for creating personal, site-specific Web crawlers", 1998.*
Bhandari, "Extraction of Web Information Using W4F Wrapper Factory and XML-QL Query Language", 1999.*
Han et al., "Wrapping Web Data into XML", 2001.*
Hosoya et al., "Regular Expression Types of XML", 2000.*
May et al., "A Unified Framework for Wrapping, Mediating and Restructuring Information from the Web", 1999.*
Liu et al., "An XML—enabled data extraction toolkit for web sources", 2001.*
Holman, G. Ken, "What Is XSLT", Aug. 16, 2000, accessed at http://www.xml.com/pub/a/2000/08/holman/index.html, 45 pages.
Wikipedia, "JavaServer Pages", accessed on Sep. 23, 2008 at http://www.wikipedia.org/wiki/JavaServer_Pages, 9 pages.

* cited by examiner

DATA TRANSFORMATION

TECHNICAL FIELD

Embodiments of the present invention relate to data transformation, and more specifically to transforming markup language files into web server type page files.

BACKGROUND

Currently, many software applications are distributed over the World Wide Web (also simply referred to as "the web" or "the Internet") such that these software applications are accessible via network accessing software, such as a web browser. One example of these software applications is a dynamic web application, such as a shopping cart. There are multiple frameworks that allow such a software application to render data over the web. Conventionally, these frameworks include a data transformation mechanism to transform data from one format into another format usable by the software application.

Data transformation problems and solutions have been around for a long time as there always seems to be data that is in one format that needs to be transformed to another format. As a result of this common problem, there have been many frameworks developed to address the various data transformation obstacles that engineers need to solve. One conventional way to transform data is to use Extended Markup Language (XML) and Extensible Stylesheet Language Transformation (XSLT). The data is essentially presented as a tree of data that can be manipulated into another tree format. The rules that decide how data gets transformed are stored in a set of Extensible Stylesheet Language (XSL) files. These rules are also referred to as XSL rules. A parser traverses a XML tree, applies the XSL rules, and then transforms the data. While this can be a very powerful approach to data transformation, it can also be more complex than needed for smaller projects or data trees that need a minimal of transformation applied.

BRIEF DESCRIPTION OF THE DRAWINGS

The present invention is illustrated by way of example, and not by way of limitation, in the figures of the accompanying drawings and in which.

DETAILED DESCRIPTION

Figure 1:
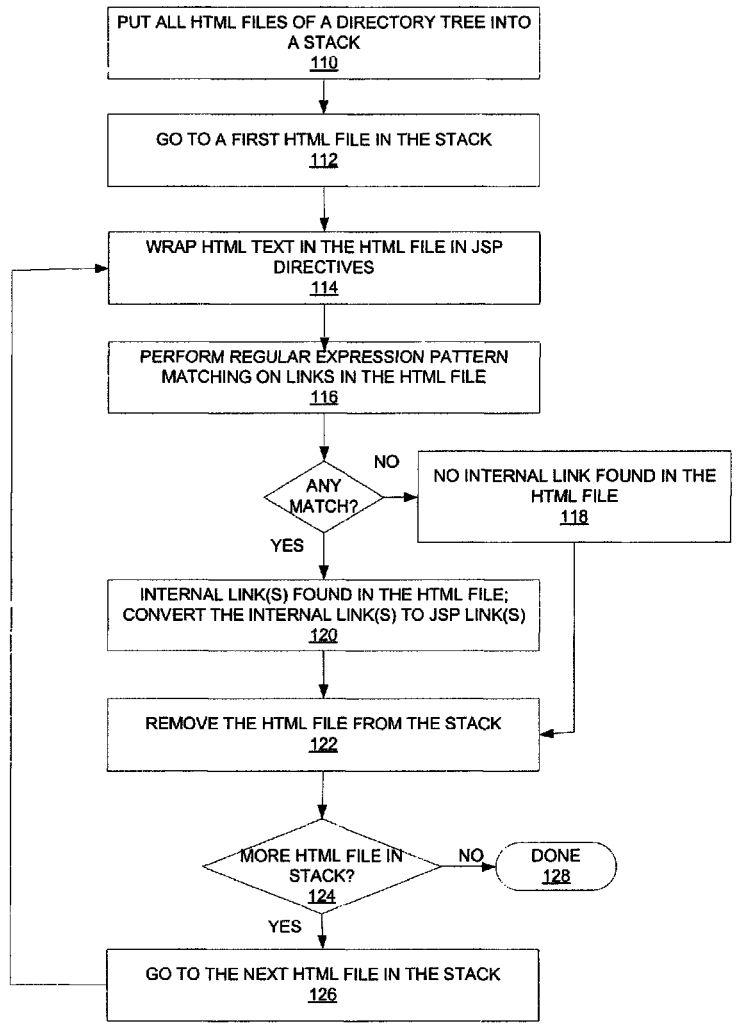
FIG. 1 illustrates one embodiment of a method to transform HTML files into JSP files.

Described herein are some embodiments of data transformation. In particular, some embodiments of the data transformation convert markup language files into web server type page files. The technique discussed herein may be applicable to many different markup languages, such as, for example, Hypertext Transfer Markup Language (HTML), Extended Markup Language (XML), etc. Furthermore, the web server type page may be Java Server Page (JSP), Active Server Page (ASP), etc.

In one embodiment, the transforming may include wrapping text in a markup language file with directives of a web server type page. Using regular expression pattern matching, internal links in the markup language file may be identified. Then the internal links identified are converted into web server type page links in order to preserve the internal links. An internal link in a markup language file of a first webpage as used herein refers to a hyperlink that references a second webpage within the same domain as the first webpage. In some embodiments, the first webpage and the second webpage are on the same server. Thus, a hyperlink in a markup language file that references another part of the same markup language file is an internal link. For instance, a document in HTML format may include one internal link for each of the chapters in the document at the beginning of the document to allow readers to conveniently jump to a specific chapter within the document by clicking at the corresponding internal link.

Unlike many conventional data transformation techniques, the above approach provides a lightweight solution to data transformation. The above approach does not depend on any specific markup language parser (e.g., XML/XSLT parser engines) to accomplish the transformation. Furthermore, the above approach does not use any complex transformation schema. Details of some embodiments of the data transformation according to the above approach are discussed below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a method to transform HTML files into JSP files. The method may be performed by processing logic that may comprise hardware (e.g., circuitry, dedicated logic, programmable logic, microcode, etc.), software (such as instructions run on a processing device), firmware, or a combination thereof. For example, the text processor 210 and the regular expression engine 220 of the data transformer 200 shown in FIG. 2 may perform at least part of the method. Note that, although the following discussion is focus on transforming HTML files into JSP files, one of skilled in the art would recognize from the following discussion that the transformation techniques discussed below are readily applicable to transformation of data in other types of markup languages (e.g., XML) into other web server type page (e.g., ASP) files.

Referring to FIG. 1, processing logic initially puts all HTML files of a directory tree into a stack (processing block 110). The HTML files contain contents of webpages. These webpages may include both text and HTML links to other webpages, which may include internal webpages and/or external webpages. Then processing logic goes to the first HTML file in the stack (processing block 112). To transform the HTML file into a JSP file, processing logic wraps the HTML text in the HTML file in JSP directives (processing block 114). For example, processing logic may wrap the HTML text in the following JSP directive:

<% @page contentType="text/html, charset=UTF-8"%>

Then processing logic performs regular expression pattern matching on HTML links in the HTML file against a set of one or more predetermined patterns (processing block 116). Because HTML links in the HTML file referencing internal webpages contain one or more of these predetermined patterns (e.g., "s2", "redhat", etc.), processing logic may distinguish HTML links referencing internal webpages from HTML links referencing external webpages by these predetermined patterns.

If there is a match between the HTML links and one or more of the predetermined patterns, then processing logic determines that the HTML links are internal links and converts the internal links to JSP links (processing block 120) and transitions to processing block 122. For instance, processing logic may determine that the following HTML link is an internal link because the following HTML link contains the pattern "s2":

s2-probes-apache-uptime.html

Thus, processing logic may convert the above HTML link by replacing the "html" extension (a markup language extension) with a "jsp" extension (a web server type page extension) as follows:

s2-probes-apache-uptime.jsp

As such, the internal links are preserved in the resultant JSP file. Otherwise, if the internal link is not converted to JSP link, an error will occur when viewers of the resultant JSP webpage clicks on the internal link.

In some embodiments, if there is no match between the HTML links and any of the predetermined patterns, then processing logic determines that there is no internal link in the HTML file (processing block 118). Then processing logic may transition to processing block 122.

At block 122, processing logic removes the current HTML file from the stack. Then processing logic checks if there is at least one more HTML file in the stack (processing block 124). If none, then the method ends at block 128. Otherwise, processing logic goes to the next HTML file in the stack (processing block 126) and returns to block 114 to repeat the above operations. By going through the stack of HTML files, processing logic uses the above recursion technique to transform all HTML files in the directory tree into JSP files.

Figure 2:
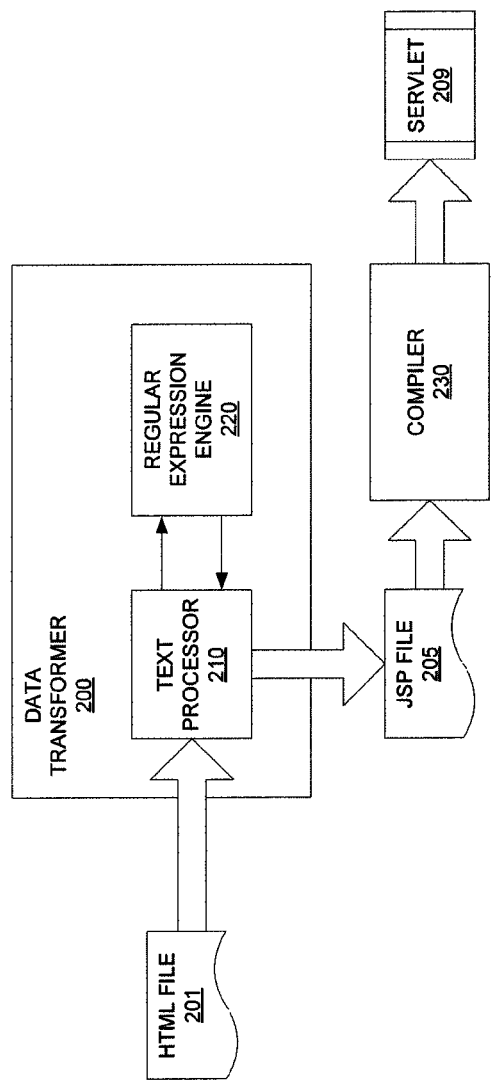
FIG. 2 illustrates a functional block diagram of one embodiment of a data transformer.

FIG. 2 illustrates a functional block diagram of one embodiment of a data transformer. The data transformer 200 includes a text processor 210 and a regular expression engine 220. The text processor 210 may be implemented by shell commands in a UNIX-like operating system (OS), such as Linux. For example, the text processor 210 may be implemented by bash scripting commands. In some embodiments, the regular expression engine 220 is implemented using a general-purpose interpreted dynamic programming language (e.g., Perl). To illustrate the operation of the data transformer 200, one example is discussed in details below.

In some embodiments, the data transformer 200 receives a HTML file 201, which is processed by the text processor 210. In one embodiment, the text processor 210 wraps the text in the HTML file 201 with JSP directives. Then the text processor 210 forwards the HTML links in the HTML file 201 to the regular expression engine 220. The regular expression engine 220 compares the HTML links against a set of one or more predetermined regular expression patterns. If there is a match in a HTML link, then the HTML link is an internal link referencing an internal webpage. The regular expression engine 220 sends the pattern matching results back to the text processor 210, which may convert the internal links identified into JSP links in order to preserve these internal links. Using the above approach, the data transformer 200 transforms the HTML file 201 into a JSP file 205.

In some embodiments, the JSP file 205 is input to a compiler 230, which compiles the JSP file 205 into a servlet 209. The servlet 209 may be executed to generate a webpage to render the content of the HTML file 201, including both the HTML text and the internal links (which have been converted to JSP links as discussed above).

Note that the data transformer 200 and the compiler 230 may be implemented on the same computing machine or on different computing machines (e.g., server, personal computer, etc.). Furthermore, the servlet 209 generated may be executed on the same computing machine on which the compiler 230 and/or the data transformer 200 are implemented, or on a separate computing machine. Also, one skilled in the art would readily recognize from the above discussion that the data transformer 200 may be modified to support other types of markup language (e.g., XML) and/or other types of web server type page (e.g., ASP).

Figure 3:
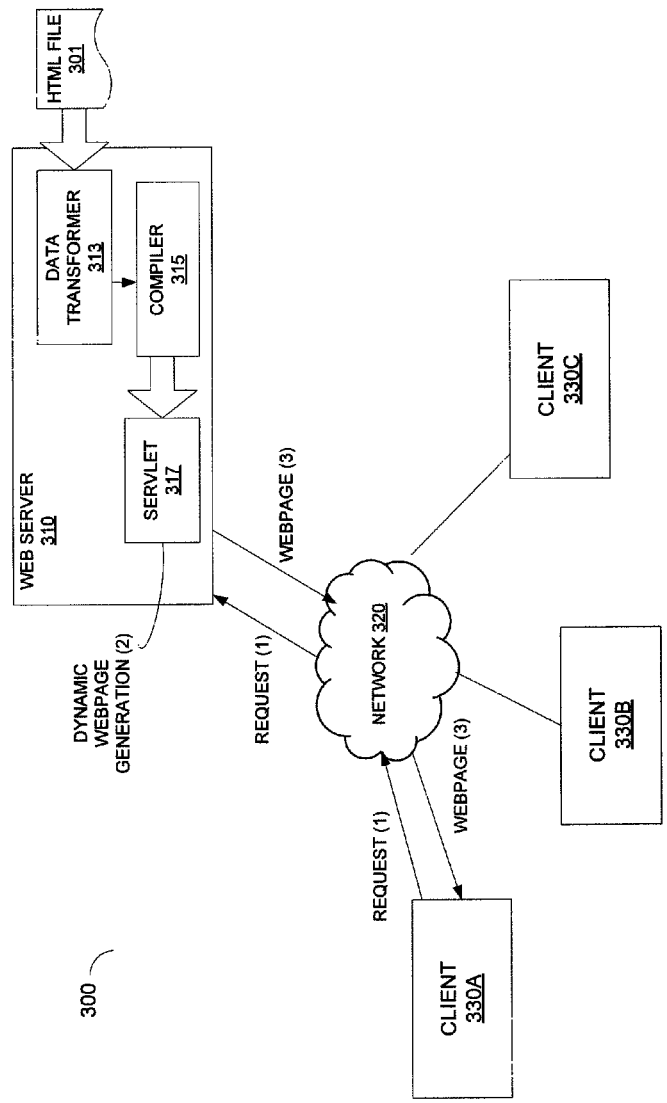
FIG. 3 illustrates one embodiment of a system in which embodiments of the present invention may be implemented.

FIG. 3 illustrates one embodiment of a system in which embodiments of the present invention may be implemented. The system 300 includes a web server 310, a network 320, and a number of clients 330A-330C. The clients 330A-330C are coupled to the web server 310 via the network 320. The clients 330A-330C may include various computing machines (e.g., servers, workstations, personal computers, laptop computers, personal digital assistants, etc.), mobile communication devices (e.g., cellular telephone, smart phones, etc.), etc. The network 320 may include a variety of networks, such as local area network (LAN), wide area network (WAN) (e.g., the Internet), personal area network (PAN), wireless network, wirelined network, etc. Furthermore, the network 320 may include secured and/or non-secured connections.

Note that any or all of the components and the associated hardware illustrated in FIG. 3 may be used in various embodiments. However, it should be appreciated that other configurations of the system 300 may include one or more additional devices not shown in FIG. 3.

In some embodiments, the web server 310 further includes a data transformer 313, a JSP compiler 315, and a servlet 317. During operation, the web server 310 receives a HTML file 301. Then the data transformer 313 may transform the HTML file 301 into a JSP file, which is compiled by the JSP compiler 315 to generate the servlet 317. Details of some embodiments of the data transformer 313 and the JSP compiler 315 have been discussed above with reference to FIG. 2.

In some embodiments, the servlet 317 is operable to dynamically generate webpages that render the HTML text in the HTML file 301. For example, the client 330A may send a request (1) to the network 320. Through the network 320, the request (1) is forwarded to the web server 310. In response to the request (1), the servlet 317 running on the web server 310 dynamically generates a webpage (2) requested by the client 330A. The webpage also renders the HTML text in the HTML file 301. The web server 310 then sends the webpage (3) generated to the client 330A via the network 320. As such, text provided to the web server 310 in the HTML file may be rendered in the web page dynamically generated by the servlet 317.

Figure 4:
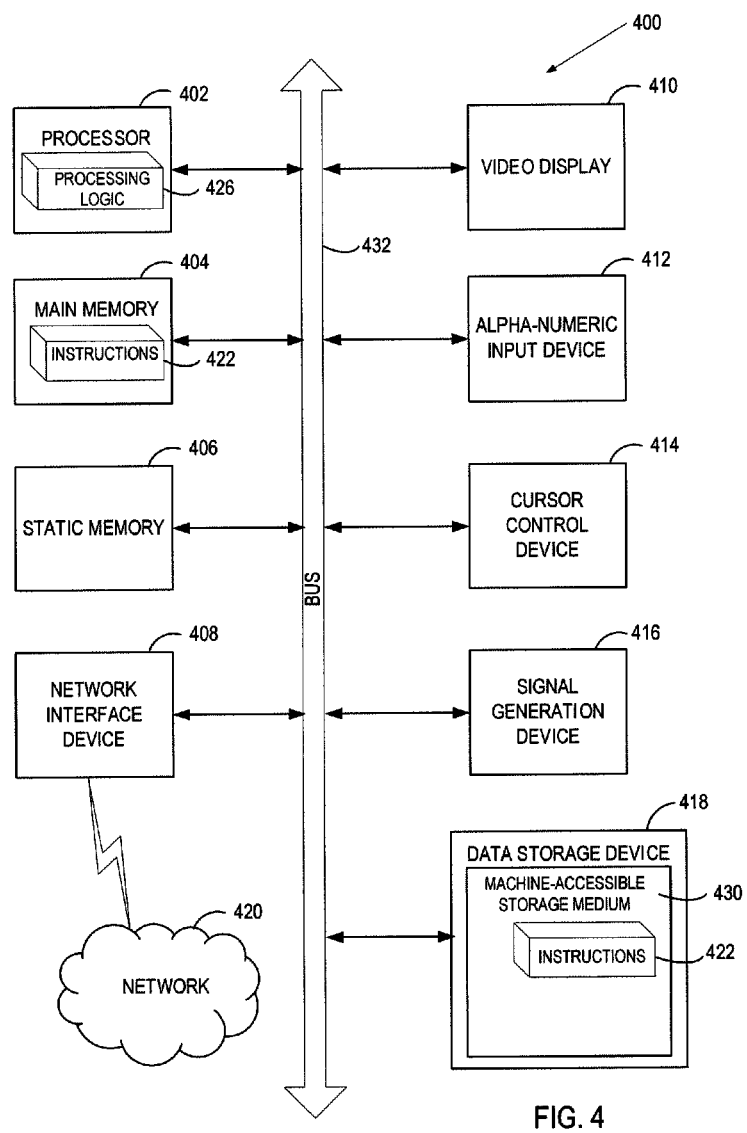
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium or a computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of data transformation have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   wrapping, by a processing device, text in a markup language file with directives of a web server type page;
   identifying, by the processing device, an internal link in the markup language file using regular expression pattern matching, the internal link comprising a markup language extension;
   converting, by the processing device, the internal link into a web server type page link by replacing the markup language extension with a web server type page extension.

2. The method of claim 1, wherein the markup language is hypertext markup language (HTML).

3. The method of claim 1, wherein the markup language is extended markup language (XML).

4. The method of claim 1, wherein the web server type page is JavaServer Pages™ (JSP).

5. The method of claim 1, wherein the web server type page is Active Server Pages (ASP).

6. The method of claim 1, wherein said wrapping text is performed in response to commands in a bash script.

7. The method of claim 1, further comprising:
   compiling, by the processing device, the web server type page file to generate a servlet on a web server, the servlet operable to dynamically generate a webpage in response to a web client request and to render content of the file in the webpage.

8. The method of claim 1, wherein the file is part of a directory tree of markup language files and the method further comprises:
   transforming, by the processing device and using recursion, the directory tree into multiple web server type page files.

9. A system comprising:
   a memory; and
   a processing device coupled to the memory to:
      wrap text in a markup language file with directives of a web server type page;
      identify an internal link in the markup language file using regular expression pattern matching, the internal link comprising a markup language extension; and
      convert the internal link into a web server type page link by replacing the markup language extension with a web server type page extension.

10. The system of claim 9, wherein the markup language is hypertext markup language (HTML).

11. The system of claim 9, wherein the markup language is extended markup language (XML).

12. The system of claim 9, wherein the web server type page is JavaServer Pages™ (JSP).

13. The system of claim 9, wherein the web server type page is Active Server Pages (ASP).

14. The system of claim 9, wherein the processing device is to wrap text in the file with web server type page directives in response to commands in a bash script.

15. The system of claim 9, wherein the processing device is to identify an internal link with a Perl script.

16. The system of claim 9, wherein the processing device is further to:
   compile the web server type page file to generate a servlet on a web server, the servlet operable to dynamically generate a webpage in response to a web client request and to render content of the file in the webpage.

17. The system of claim 9, wherein the file is part of a directory tree of markup language files and the processor is to transform the directory tree into multiple web server type page files using recursion.

18. The system of claim 9, further comprising:
   a web server coupled to the processing device, the web server comprising:
      a second memory; and
      a second processing device coupled to the second memory to execute a servlet generated from the web server type page file to generate a web page to render content of the file in the webpage.

19. The system of claim 18, further comprising:
   a client machine communicably coupled to the web server via a network to request and to receive the webpage from the web server.

20. A non-transitory computer-readable medium having instructions encoded thereon that, when executed by a processing device, cause the processing device to perform operations comprising:
   wrapping, by the processing device, text in a markup language file with directives of a web server type page;
   identifying an internal link in the markup language file using regular expression pattern matching, the internal link comprising a markup language extension;
   converting, by the processing device, the internal link into a web server type page link by replacing the markup language extension with a web server type page extension.

21. The non-transitory computer-readable medium of claim 20, wherein the markup language is hypertext markup language (HTML).

22. The non-transitory computer-readable medium of claim 20, wherein the markup language is extended markup language (XML).

23. The non-transitory computer-readable medium of claim 20, wherein the web server type page is JavaServer Pages (JSP).

24. The non-transitory computer-readable medium of claim 20, wherein the web server type page is Active Server Pages (ASP).

25. The non-transitory computer-readable medium of claim 20, wherein said wrapping text is performed in response to commands in a bash script.

26. The non-transitory computer-readable medium of claim 20, wherein the operations further comprise:
   compiling the web server type page file to generate a servlet on a web server, the servlet operable to dynamically generate a webpage in response to a web client request and to render content of the file in the webpage.

27. The non-transitory computer-readable medium of claim 20, wherein the file is part of a directory tree of markup language files and the operations further comprise:
   transforming, using recursion, the directory tree into multiple web server type page files.

* * * * *